Patented Dec. 7, 1937

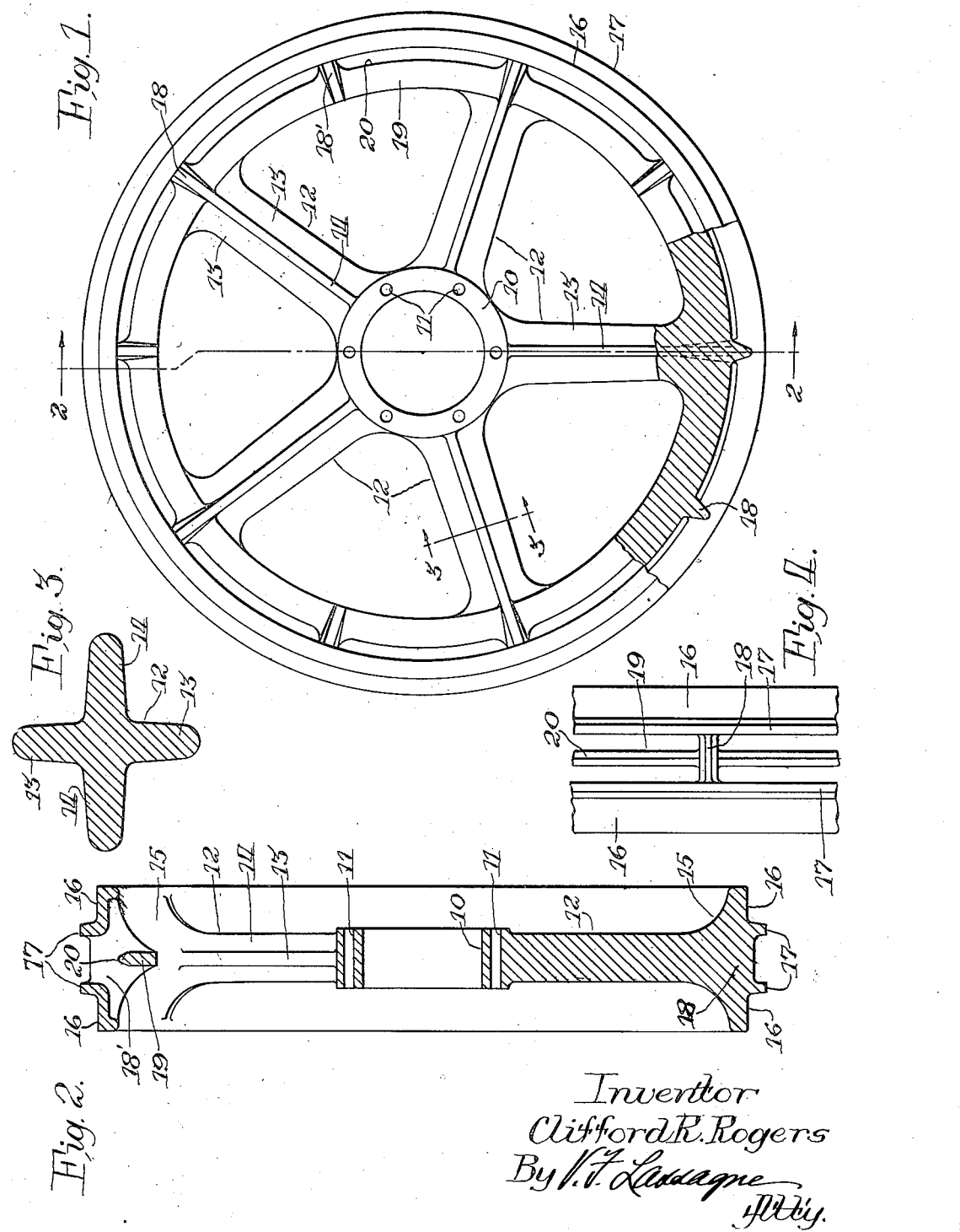

2,101,454

UNITED STATES PATENT OFFICE 2,101,454

FRONT IDLER WHEEL FOR CRAWLER TRACTORS

Clifford R. Rogers, Oak Park, Ill., assignor to International Harvester Company, a corporation of New Jersey Application June 14, 1935, Serial No. 26,659

9 Claims. (Cl. 74—230.3)

This invention relates to an improved front idler wheel for crawler tractors.

The crawler units for crawler tractors embody an endless track shoe belt driven by a rear driving sprocket wheel, the forward loop of said endless belt being trained around an idler or guide wheel carried at the forward end of a so-called roller truck frame resting on the ground run of the track shoe belt. In operating over various ground conditions the track shoe belt picks up mud, dirt and sand accumulations, which frequently are carried by the track shoe belt to be lodged on the front idler wheel. Sometimes these accumulations are so great that the idler wheel cannot properly perform its track shoe belt guiding function. It is desirable, therefore, that an improved guide wheel construction be provided, which will be self-cleaning and will readily rid itself of fouling accumulations. To save weight and expense of manufacture, it is further desirable that such idler wheels be constructed as lightly as possible without sacrificing strength.

Accordingly, the main object of this invention is to provide an improved idler guide wheel for the purpose stated.

Another object is to provide a one-piece, integrally cast idler wheel of open-work, skeletonized construction.

Another object is to provide a guide wheel which will clean itself of accumulations of foreign matter as the track shoe belt rides therearound.

Other important objects will be apparent to those skilled in this art as the disclosure is more fully made.

Briefly these desirable objects may be achieved by the improved form of idler wheel illustrated in the accompanying sheet of drawing, in which the wheel is formed integrally in one piece, the same having a central hub with spokes radiating therefrom which are formed as a cross in cross section. The outer ends of these spokes have their transverse webs of the cross section merged into a pair of spaced flange or rail portions on which the links of the track shoe belt ride, while the longitudinal webs of the cross section of the spokes lie in the plane of the wheel and in the direction of travel and are merged with a radial flange lying in the plane of the wheel and arranged radially inwardly of and between the flange rail portions of the idler wheel rim.

This construction results in an open-work skeletonized rim structure which serves to rid the rim of dirt accumulations as the track shoe links of the endless belt ride over the wheel rim.

In the accompanying drawing:

Figure 1 is a side elevational view of the improved idler wheel, a segment thereof being shown in section;

Figure 2 is a vertical sectional view through the idler wheel taken along the line 2—2 of Figure 1, looking in the direction of the arrows;

Figure 3 is a cross sectional view through one of the radial spokes taken along the line 3—3 of Figure 1, looking in the direction of the arrows; and, Figure 4 is a plan, end view of a segment of the wheel looking radially inwardly at the rim.

This improved wheel is formed in one piece, and preferably as a casting, the same embodying a hub portion 10 formed with transverse openings 11 therethrough to receive bolts for fastening any appropriate form of hub cap means, not shown, and for sealing the end of the shaft which carries said hub 10. In the particular form of the invention shown for purposes of this illustration, the hub 10 has integrally formed therewith five radial spokes 12, which, as shown in Figure 3, are cross-shaped in cross section providing fore and aft flanges 13 lying in a vertical plane extending centrally through the wheel and also transverse flanges 14 at a right angle to the flanges 13. These flanges 13 and 14 merge in a curve with the hub 10, as shown in Figure 1.

The transverse flanges 14 are radially longer than the flanges 13, as shown in Figure 1, and at their outer ends are curved outwardly in opposite directions, as shown at 15 in Figure 2, to merge with integrally formed rim portions 16. These rim portions 16 are spaced apart to provide track portions on which ride the side links of the track shoe of the endless belt, not shown, said rims including raised flanges 17 extending radially outwardly and on which flanges the pins or rollers of the track shoe belt ride. The outer ends of the transverse webs 14 are merged with these flange portions 16 to form transverse or axially extending webs 18 which cross-connect the two flange portions 17 and 16, as shown in Figure 2. These webs 18, as shown in Figures 1 and 4, are V-shaped in cross section, the sloping surfaces serving as wedges to permit dirt accumulations to slough thereover.

The flanges 13 lying in the plane of the wheel merge into a radially disposed annular flange portion 19, which portion 19 is also merged and cast into the cross webs 18, as shown in Figure 2. Said vertical rim 19 has a pointed outer edge 20 which lies radially inwardly of the rim portion 16, as shown in Figure 2. Further, as shown, the rim 19 is concentric and is of a width, in an axial direction, substantially less than the axial distance between the rail portions 17.

The rim portion 19 at equidistant points spaced between the spokes 12 is formed with cross web portions 18' extending between the flange roller portion 16 on the rim of the wheel in the same fashion as at the cross webs 18.

In use and operation the idler wheel has its hub 10 slipped over a shaft about which the wheel is to turn. The endless track shoe belt has its front loop trained around the wheel, so that the side bars or links of the track shoe belt rest and ride on the laterally spaced, horizontal flange portion 16 of the rim and the radial, spaced flanges 17 thereof carrying the cross pins which connect the side bars of the track shoe belt. As dirt accumulations fall off the track shoe belt and into the rim of the wheel, they are wedged out by the co-operative relationship of the rim of the wheel and the track shoe belt, such dirt accumulations being wedged by the V-shaped or pointed transverse webs 18 and 18' and also by the substantially continuous longitudinal wedge edge 20 on the radial rim 19 lying in the plane of the wheel radially inwardly of the rail surfaces 16.

From this disclosure it will now be appreciated that an improved idler wheel has been provided for the purposes stated, which is practicable in construction and achieves the desirable objects heretofore recited.

It is the intention to cover all such changes and modifications of the particular embodiment of the invention herein disclosed and described which do not in material respects constitute departures from the spirit and scope of the invention as covered by the appended claims.

What is claimed is:

1. An integrally formed idler wheel having a hub and spokes radiating therefrom, a rim formed on the outer ends of the spokes and comprising a pair of axially spaced rail portions, a rim portion lying radially in the plane of the wheel between the rail portions and carried on the spokes radially inwardly of the rail portions, said rim portion being substantially narrower than the space between the pair of rail portions, said spoke ends being connected between the rail portions by means forming cross webs.

2. An integrally formed idler wheel having a hub and spokes radiating therefrom, said spokes being cross shaped in cross section to provide a pair of transverse webs and a pair of opposite webs lying in the plane of the wheel, a rim formed on the outer ends of the spokes and comprising a pair of axially spaced rail portions connected to the transverse webs of the spokes, a rim portion lying radially in the plane of the wheel between the rail portions and carried on the spokes radially inwardly of the rail portions and connected to the webs thereof lying in the plane of the wheel, said spoke ends being transversely connected between the rail portions and said rim portion being narrower than the space between said rail portions.

3. An integrally formed idler wheel having a hub and spokes radiating therefrom, a rim formed on the outer ends of the spokes and comprising a pair of transversely spaced rail portions, a rim portion lying radially in the plane of the wheel between the rail portions and carried on the spokes radially inwardly of the rail portions, said rim portion being of less width than the space between the rail portions and having a pointed peripheral outer edge, said spoke ends being connected between the rail portions and forming transverse webs, said webs being V-shaped in cross section to form a wedge shaped outer edge.

4. An integrally formed idler wheel having a hub and spokes radiating therefrom, said spokes being cross shaped in cross section, a rim formed on the outer ends of the spokes and comprising a pair of transversely spaced rail portions, a rim portion lying radially in the plane of the wheel in spaced relation to and between the rail portions and carried on the spokes, said spoke ends being connected between the rail portions and rim portion by means forming transverse webs.

5. An idler wheel having a hub and spokes radiating therefrom, said spokes being cross shaped in cross section, a rim formed on the outer ends of the spokes and comprising a pair of transversely spaced rail portions, a rim portion lying radially in the plane of the wheel between the rail portions and spaced therefrom and carried on the spokes radially inwardly of the rail portions, said spoke ends being connected between the rail portions and rim portion by means forming transverse webs, said webs and rim portion being wedge shaped with their pointed edges facing radially outwardly.

6. An integrally formed idler wheel having a hub and spokes radiating therefrom, a rim formed on the outer ends of the spokes and comprising a pair of transversely spaced rail portions, a rim portion lying radially in the plane of the wheel between and in spaced relation to the rail portions and carried on the spokes radially inwardly of the rail portions, said spoke ends being connected between the rail portions by means forming transverse webs, and other cross connecting web portions between the rail portions disposed substantially equidistantly between the spoke ends and also connected to said rim portion.

7. An idler wheel structure embodying a hub and spokes radiating therefrom in substantially equidistant angular spacing, an annular rim carried on the outer ends of the spokes and comprising a pair of transversely spaced annular flat rim portions each of which at its inner edge is formed with a radially outwardly extending annular flange, another rim portion carried on the spoke ends in a position radially inwardly of the aforementioned rim portions and lying in a plane of the wheel disposed between and spaced from the pair of annular flanges, and substantially equidistantly angularly spaced cross webs connecting the pair of flat rim portions with the inner or radial rim portion.

8. An idler wheel structure comprising a hub and spokes, a concentric rim carried on the spokes comprising a pair of axially spaced rim portions, and a concentric rim carried on the spokes intermediate the aforementioned rim portions, said last mentioned rim being of substantially less width in an axial direction than the axial space between the pair of rims.

9. An idler wheel as defined in claim 8, in which the intermediate concentric rim is entirely disposed radially inwardly of the pair of rims.

CLIFFORD R. ROGERS.